April 6, 1965     H. HERSHEY     3,176,427
BAIT BAG FOR CRAB FISHING
Filed Oct. 16, 1962
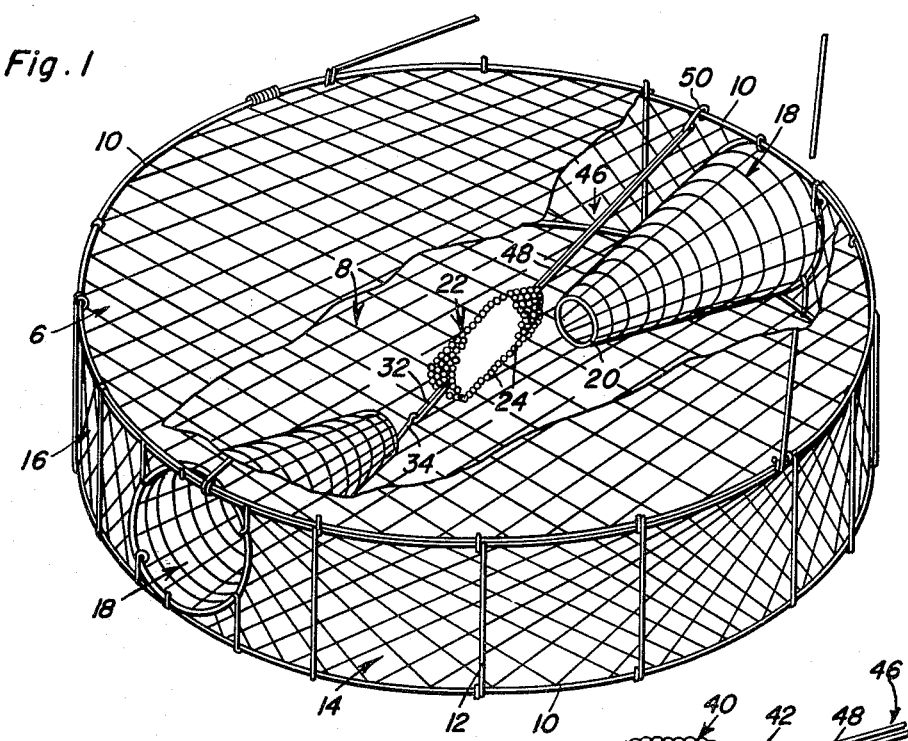
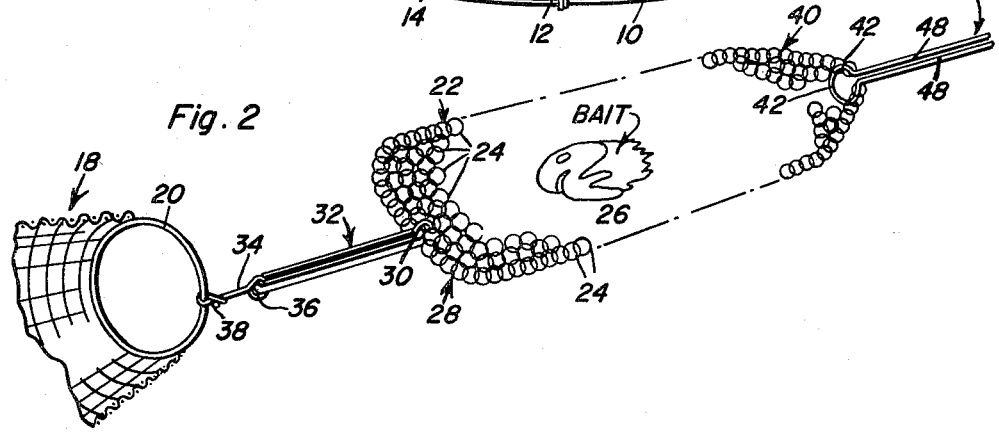
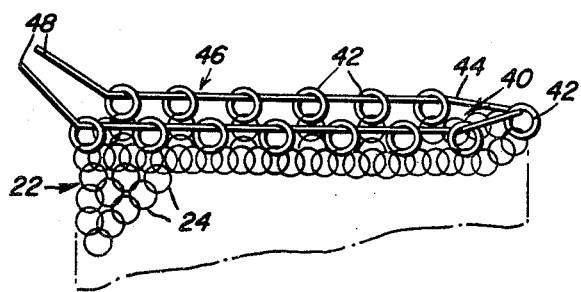
Henry Hershey
INVENTOR.

3,176,427
BAIT BAG FOR CRAB FISHING
Henry Hershey, P.O. Box 174, Chinook, Wash.
Filed Oct. 16, 1962, Ser. No. 230,812
3 Claims. (Cl. 43—100)

The present invention relates to an improved crab fishing bait bag and means carried by the respective ends of said bait bag and functioning to suspend said bag in a novel safeguarded manner within the confines of a conventional-type crab pot or trap.

Bait bags such as are currently being used are neither strong nor durable. In fact, currently used crab pots and bait containers (usually made of netted cord) are vulnerable and subjected to early damage. They are consequently short lived and not reliably efficient.

It is an object of the present invention to advance the art of crab fishing by effectively enticing the potential victims to enter the confines of the trapping space of the trap, more particularly, to prolong the effectiveness of the enclosed bait bag and bait contained therein.

Briefly the invention is characterized, in part, by a circular or an equivalent openwork crab trap the rim portion of which is provided with truncated crab inlet funnels, and, in addition, by the bait bag therein. The bait bag is of primary importance and is unique in that it is made of non-corrodible substantially indestructible material, for example, link mesh fabric such as is commonly employed in the manufacture of stainless steel wire-ring handbags.

In carrying out the principles of the invention the stainless steel ring or interconnected link mesh material is fashioned into a bait bag. The bag is loaded with chum, for example, razor clams. When trapped crabs "chew" the bag it remains intact and yet permits juices to exude therefrom in a manner to permeate the surrounding water and attract additional crabs which ultimately, attracted by the bait in the bag, end up in the trap.

The invention also features the wear and tear resisting bait bag one end of which has an openable and closable mouth and wherein a purse string is threaded through the rings or links bordering the mouth, the ends of the purse string being secured to a snap fastener and said snap fastener being anchored on a relatively stationary component part of the trap in a manner to suspend and anchor one end of the bait bag.

More specifically, the bait bag is provided at its bottom with a permanently attached ring which in turn is provided with an elastic or an equivalent band, one end of the band being connected to the bag by way of the ring and the other free end being connectible to a link which is anchored on an adjacent funnel-end or other part of the trap so as to yieldingly suspend the bait bag in the confining space of the trap.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of a conventional type crab trap rigged for use in accordance with the present concept;

FIGURE 2 is a view also in perspective and on an enlarged scale and which illustrates the squeezable corrosion-resisting bait bag and which also illustrates the bag's associated suspending and anchoring means; and FIGURE 3 is an enlarged fragmentary view of the mouth of the bait bag and which emphasizes the purse string laced through the ring-type eyes which are provided therefor.

As is perhaps evident from the several views of the drawing the overall inventive concept has to do with the improved bait bag as such and also in combination with a crab pot or trap of the type illustrated.

The crab pot or trap which is being shown is of circular construction and comprises (FIGURE 1) an openwork circular top 6 and a corresponding circular openwork bottom 8. Each part 6 or 8 has a ring-like reinforcing frame 10 and these frames are connected together by stays 12. The stays also are enclosed with openwork wire or equivalent fabric 14 thus defining a perimeter wall or rim 16. The crabs and other trappable victims enter the trapping space by way of conical intakes or entrances each of which is denoted by the numeral 18. The inner truncated end of each intake terminates in reinforcing ring-like frame 20.

Taking up now the unique bag 22 it will be obvious that it may be constructed in any one of a number of different ways so long as it is substantially indestructible and the material is non-corrodible. In other words, appropriate stainless steel interconnected rings or links will, more likely than not, be utilized. The rings or links are generally denoted here by the reference numeral 24. The cylindrical body portion of the bag is denoted at 26 and the yieldingly anchored bottom wall is denoted generally at 28. The latter is provided at its center with an anchoring ring 30 to which a coacting end of the elastic anchoring band 32 is yieldingly supported, in fact suspended as at 34, 36 and 38 so that it is clear of engagement with either the top or bottom components 6 or 8 of the trap. The opposite or righthand end portion of the bag is fashioned into an openable and closable mouth which is designated generally at 40 in FIGURE 2. The rings or links 42 which define the mouth portion serve to accommodate the threaded portion 44 of the bag opening and closing purse string 46. The end portions 48 of the purse string are connected with a snap fastener or an equivalent retaining device 50 which is separably connectible with the ring frame 10 as illustrated in FIGURE 1. By loosening the pull or stress on the purse line the mouth of the bag can be opened and the receptacle portion loaded with juicy clams or the like, in fact any mushy and squeezable bait which acts to provide the desired chum.

By yieldingly suspending and properly anchoring the indestructible bait bag in the space as shown in FIGURE 1 the potential victims on the outside of the trap cannot get access to the bag. When, however, certain of the victims have been trapped they will continue to claw the squeezable bait bag and, in so doing, the chum will ooze out and permeate the water with the result that an effective and enticing lure is had.

It is submitted that a stainless steel or an equivalent mesh bait bag constitutes, when used in a suspended position in a crab pot, a superior means of enticing and entrapping crabs and the like. The gauge of the component rings of the bag may be sufficiently small that a bag body will be had which will actually keep sea fleas and other small creatures from stealing the bait.

It is reiterated that the disclosure (including the invention as claimed) is directed to the novel bait bag and the means at the opposite ends for suspending and mounting the same in a crab pot or trap of any suitable type. In addition novelty is predicated on the bait bag considered in conjunction with a crab trap or pot, for example, the one shown in FIGURE 1.

It is believed that a careful consideration of the specification in conjunction with the views of the drawing will enable the reader to obtain a clear and comprehensive understanding of the invention, the features and advantages thereof, and the manner of using the same. Consequently, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in a crab trap, a bag for crab bait made of a multiplicity of relatively small non-corrodible rigid rings flexibly and hingedly linked to each other and providing a mesh bag which is adapted to be loaded with chum and which lends itself to clawing and squeezing by entrapped crabs, said bag being elongated, being closed at its bottom, closed along its respective longitudinal sides and having an openable and closable mouth at its top, said mouth having spaced cooperably aligned rings for a drawstring, a drawstring having portions thereof laced through said mouth rings so that when the drawstring is properly pulled upon and tautened it functions to draw the mouth rings together and close the mouth of said bag, said drawstring having an outer anchorable end which is free and provided with manually attachable drawstring anchoring means, said means being adapted to be releasably engaged with a relatively stationary part of the trap in which said bag is enclosed and suspended, an elongated elastic element having one end thereof attached to a median part of the cooperating bottom of said bag, said elastic element being provided with a rigid anchoring element having a free end which is adapted to be attached to a cooperating relatively stationary part of said trap whereby the bag is yieldingly suspended and anchored in the trap in readiness for use by the victim crabs.

2. For use within the confines of the crab trapping space of a crab trap, a bodily applicable and removable bait bag of elongated form and permanently closed at one end and openable and closable at its other end, said openable end constituting and providing a mouth which is adapted to assist the user in charging and loading the bag with bait, and chum, for instance, said openable mouth embodying a plurality of alignable purse string accommodating and retaining rings, a purse string laced through said rings, said purse string when tightened serving to draw said rings together in a manner to contract and thus retain said mouth in its closed state, said purse string having an end portion provided with a readily attachable and detachable anchoring device for the purse string and also the mouth end of the bait bag, said bag being made up of a multiplicity of relatively small non-corrodible rings flexibly interconnected and hingedly linked together in contiguous relationship and providing a squeezable mesh bag whereby when the bag is charged with chum the action of the trapped crab's clawing and squeezing the bag serves to express juices therefrom while at the same time preventing the crabs from getting at the chum and quickly consuming it, said bag having a bottom opposite said mouth, said bottom being centrally provided midway between the longitudinal sides thereof with an attaching ring, and an elastic element having one end thereof connected to said attaching ring, the other end of said elastic element being free and provided with an anchoring link which is adapted to be anchored on an accessible component part within the aforementioned space of the crab trap.

3. For use in a crab trap having openwork top and bottom walls, a marginal wall connecting marginal portions of the top and bottom walls, reinforcing members incorporated in the respective walls and defining a trapping space, and at least one truncated conical intake funnel projecting into said trapping space: an improved holder for crab bait, for example, juicy chum, comprising an elongated chum confining bait bag made of a multiplicity of relatively small non-corrodible rings flexibly interconnected and hingedly linked together in contiguous relationship and providing a fine mesh bag which lends itself to squeezing by the trap victim's clawing the bag, said bag being elongated, being closed at its bottom, closed along its respective longitudinal sides and having an openable and closable mouth at its top, said mouth portion of the bag having spaced cooperably aligned rings for a drawstring, an inelastic drawstring laced through said last-named rings and which when tightened serve to draw said last-named rings together in a manner to contract and thus retain said mouth in a closed state, a snap fastener connected to free end portions of the inelastic drawstring and adapted to be separably connected with a cooperating, component part of the aforementioned crab trap, an elongated elastic anchoring band, a ring connecting one end of said band to a median portion of the bottom of said bait bag, a link having an eye to which the other end of the band is connected, said link being connected to be anchored on a component part of the aforementioned crab trap.

References Cited by the Examiner

UNITED STATES PATENTS

| | | | |
|---|---|---|---|
| 3,741 | 9/44 | Carr | 43—100 |
| 563,356 | 7/96 | Broekelmann | 43—105 X |
| 616,924 | 1/99 | Heberling. | |
| 1,445,763 | 2/23 | Gibbs et al. | 43—100 |
| 1,814,378 | 7/32 | Gilbertson et al. | 150—1 |
| 2,220,330 | 11/40 | Hilger | 5—120 X |
| 2,607,155 | 8/52 | Van der Clute | 43—44.99 |
| 2,616,467 | 11/52 | Cicero | 150—1 |
| 2,736,986 | 3/56 | Goldstein | 43—103 |
| 2,910,801 | 11/59 | Safarik et al. | 43—105 |

FOREIGN PATENTS

| | | |
|---|---|---|
| 513,246 | 11/30 | Germany. |
| 608,176 | 1/35 | Germany. |
| 405,803 | 2/34 | Great Britain. |

SAMUEL KOREN, *Primary Examiner.*